Figure 1:
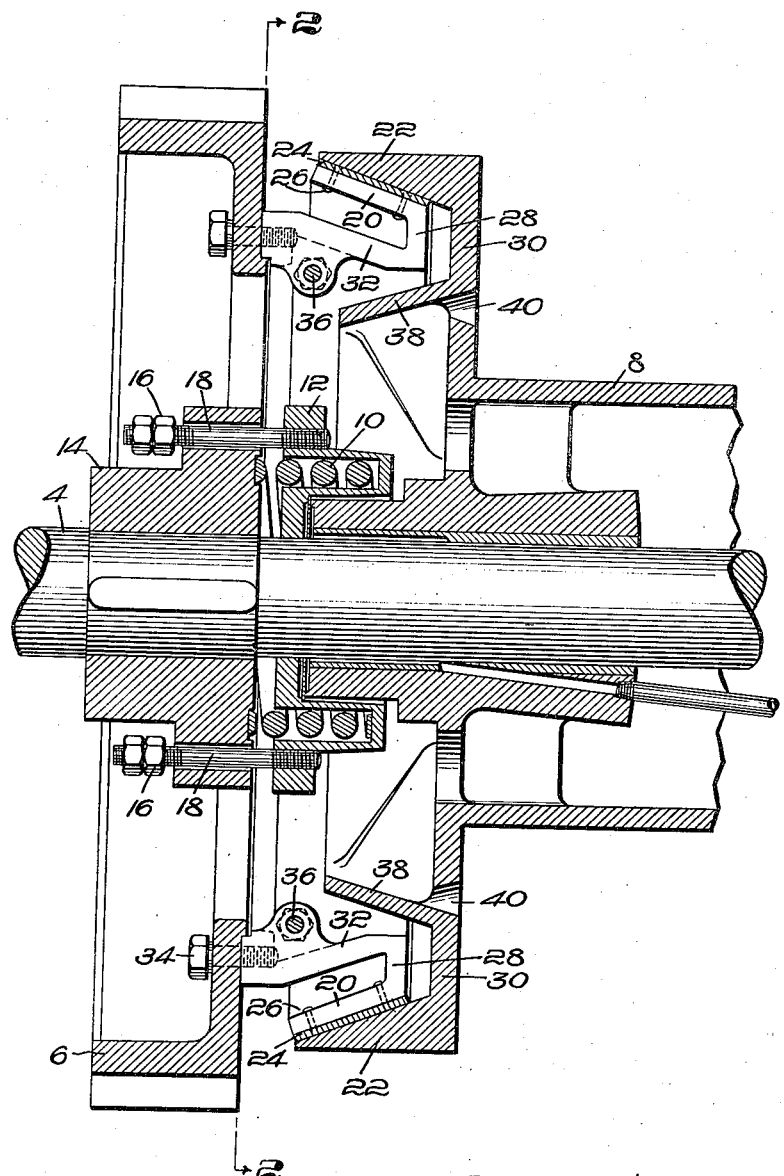

Feb. 19, 1924.

A. E. NORRIS 1,483,948

CLUTCH

Filed April 29, 1921   2 Sheets-Sheet 1

Inventor:
Almon E. Norris,
by Emery, Booth, Janney & Varney
Attys.

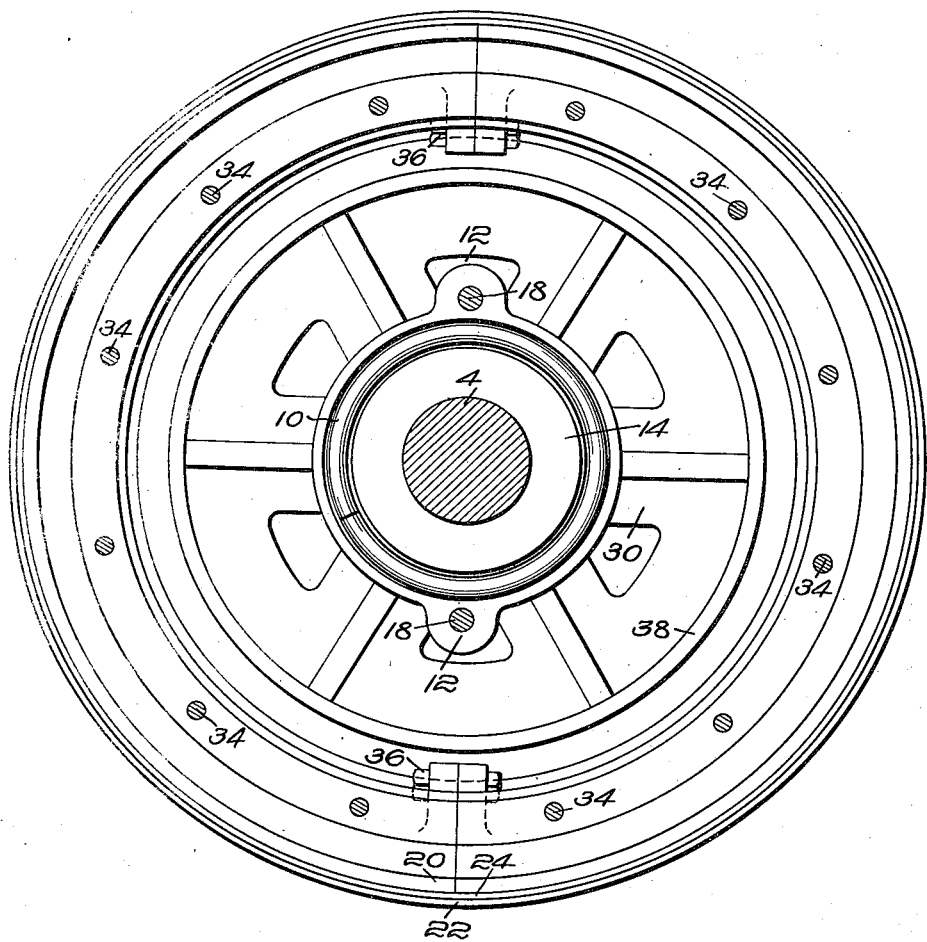

Patented Feb. 19, 1924.

1,483,948

UNITED STATES PATENT OFFICE.

ALMON E. NORRIS, OF BROOKLINE, MASSACHUSETTS.

CLUTCH.

Application filed April 29, 1921. Serial No. 465,378.

*To all whom it may concern:*

Be it known that I, ALMON E. NORRIS, a citizen of the United States, and a resident of Brookline, in the county of Norfolk and State of Massachusetts, have invented an Improvement in Clutches, of which the following description, in connection with the accompanying drawings, is a specification, like characters on the drawings representing like parts.

This invention relates to clutches of the class in which the engaging surfaces are concentric, and is more particularly though not exclusively concerned with a cone clutch of the class used in connection with hoisting engines for driving the rope-winding drum.

The invention will be best understood by reference to the following description, when taken in connection with the accompanying drawings of one specific embodiment thereof, while its scope will be more particularly pointed out in the appended claims:

In the drawings:

Fig. 1 is a central, longitudinal section of a clutch exemplifying the invention; and Fig. 2 is a sectional view on line 2—2 of Fig. 1.

Referring to the drawings, and to the embodiment of the invention which is selected for exemplification, there is shown a portion of a hoisting engine comprising a shaft 4, to which is keyed a gear 6, usually driven by a pinion which in turn is driven by the crankshaft of the hoisting engine, the pinion and crankshaft, however, not being shown herein as they have nothing to do with the present invention. Loosely mounted on the shaft is a rope-winding drum 8, which is free to slide axially under the influence of any usual actuating means such as a screw and nut not shown. A helically coiled spring 10 interposed between a yoke 12 and an adjacent hub 14 of the gear 6 constantly tends to urge the drum toward the right (Fig. 1). Movement under the influence of the spring is herein limited by stops 16 conveniently in the form of nuts threaded onto bolts 18, the latter in turn being threaded into the yoke 12.

Power is transmitted from the gear 6 to the rope-winding drum 8 by a clutch having inner and outer annular parts, herein cones 20 and 22, presenting engaging faces through which the power is transmitted. Herein the inner cone is faced with a facing 24 of suitable material such as leather or asbestos composition clutch-facing material suitably secured thereto as by rivets 26. Heretofore in clutches of this class, difficulty has been had with over heating of the clutch faces, and it has been found that this is very largely due to unequal expansion of the inner and outer parts, causing the engaging surfaces to bear with greater pressure in one part of their area than in another. Naturally this causes uneven wear of the clutch facing. This is obviated by the novel construction which will now be described.

The inner and outer cones 20 and 22 are supported at corresponding ends by webs 28 and 30, while the remaining ends are otherwise unconnected to the supports. The web 28 is connected by an annular flange 32 to the gear 6, to which it is conveniently secured by a series of cap screws 34. The inner clutch member as thus constituted is preferably divided diametrically, and its two parts secured together as by bolts 36 in the manner shown in Fig. 2. The cone 20, web 28 and flange 32, are herein formed as one piece, which is a U-shaped cross-section as viewed in Fig. 1, one leg of the U constituting the cone, the other the connection to the driving gear, and the base of the U being the connecting part close to the body of the outer cone, thus providing for corresponding expansion and contraction of both cones. The web 30 is herein extended inwardly, and is conveniently formed integrally with the drum 8.

Another serious problem in connection with the operation of clutches of this class is the fact that oil or grease used for lubricating the bearing of the drum on the shaft finds its way to the engaging surfaces through which the power is transmitted from one clutch member to the other, and causes slipping of the clutch. In the present contruction, this is avoided by the use of an oil guard 38 intermediate the axis of the clutch and the frictional surfaces, said guard being conveniently in the form of an annular flange herein integral with and projecting laterally from the web 30. This flange catches oil or grease thrown outwardly toward the friction surfaces, and causes the same to escape through one or more openings 40 in the web 30. Preferably, the flange is inclined outwardly toward said openings, or in other words, it is tapered or conical to assist the travel of the oil or grease by the combined action of gravity and centrifugal force. It should now be evident that oil which might otherwise find its way beween the webs 28 and 30 to the engaging surfaces of the inner and outer cones is carried away through the opening or openings 40 and cannot interfere with the proper working of the clutch.

Having thus described one embodiment of the invention, but without limiting myself thereto, what I claim and desire by Letters Patent to secure is:

1. In a clutch, the combination of two cooperating clutch members having parts provided with concentric engaging faces, said members presenting supports providing for corresponding radial expansion and contraction of said parts, one of said members having a generally U-shaped cross-section, one of said parts constituting one leg of the U.

2. In a clutch, the combination of inner and outer annular parts presenting engaging circumferential surfaces, and supporting means for said parts, including a support having a U-shaped cross-section, one leg of the U supporting the inner of said surfaces.

3. In a clutch, the combination of inner and outer annular parts presenting engaging circumferential surfaces, a support for the outer part extending from one end thereof inward toward the axis, and a support for the inner part extending from the corresponding end inward toward the axis, thence lengthwise of said axis toward the other end and finally inward toward the axis.

In testimony whereof, I have signed my name to this specification.

ALMON E. NORRIS.